(12) United States Patent
Omori et al.

(10) Patent No.: US 7,933,189 B2
(45) Date of Patent: Apr. 26, 2011

(54) FOCUS OPTICAL SYSTEM AND OPTICAL DISC MASTER EXPOSURE APPARATUS

(75) Inventors: Takeshi Omori, Osaka (JP); Takaaki Kassai, Osaka (JP); Kenji Maebara, Kyoto (JP); Keiji Fujita, Kyoto (JP); Hiroaki Ashiwa, Ibaraki (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 12/423,911

(22) Filed: Apr. 15, 2009

(65) Prior Publication Data
US 2009/0262634 A1 Oct. 22, 2009

(30) Foreign Application Priority Data

Apr. 18, 2008 (JP) ................................. 2008-108821

(51) Int. Cl.
*G11B 7/00* (2006.01)
(52) U.S. Cl. ........................ 369/120; 369/112.24; 369/94
(58) Field of Classification Search .................. 369/120, 369/94, 112.24
See application file for complete search history.

(56) References Cited

U.S. PATENT DOCUMENTS

| 6,809,829 | B1 | 10/2004 | Takata et al. |
| 7,016,269 | B2* | 3/2006 | Ogasawara et al. ........ 369/44.25 |
| 2007/0081441 | A1 | 4/2007 | Yokota |
| 2007/0242575 | A1 | 10/2007 | Nakamura et al. |
| 2009/0257340 | A1* | 10/2009 | Nagata et al. .................. 369/121 |

FOREIGN PATENT DOCUMENTS

| JP | 11-175987 | 7/1999 |
| JP | 2001-108877 | 4/2001 |
| JP | 2001-216659 | 8/2001 |
| JP | 2002-329338 | 11/2002 |
| JP | 2007-287232 | 11/2007 |

* cited by examiner

*Primary Examiner* — Adam R Giesy
(74) *Attorney, Agent, or Firm* — Wenderoth, Lind & Ponack, L.L.P.

(57) ABSTRACT

In a focus optical system for optical discs or optical disc master exposure apparatuses, a relative positional relation between a cylindrical lens and a 4-division detector in an astigmatic optical system is adjust so that an interference fringe appearing in reflected light derived from an optical disc master is made to be incident on a dead zone of the 4-division detector. Thus, an astigmatic focus servo free from effects of variations in a focus error signal due to the interference fringe is realized. As a result of this, effects of the interference fringe appearing in the reflected light derived from an optical disc or optical disc master can be suppressed.

4 Claims, 10 Drawing Sheets

Fig. 5C  PHOTOSENSITIZER FILM THICKNESS 80 nm

Fig. 5B  PHOTOSENSITIZER FILM THICKNESS 70 nm

Fig. 5A  PHOTOSENSITIZER FILM THICKNESS 30 nm

FOCUS OPTICAL SYSTEM AND OPTICAL DISC MASTER EXPOSURE APPARATUS

BACKGROUND OF THE INVENTION

1. Field of the Invention

The present invention relates to a focus optical system for optical discs or optical disc master exposure apparatuses to be used for mass production of optical discs.

2. Description of Related Art

In production of optical discs, a stamper is first prepared by using a glass master as an optical disc master, and then copied reproduction of optical discs is performed by injection molding with use of the prepared stamper. Also, by an optical disc master exposure apparatus, recording light is projected to a recording layer (resist film) provided on the optical disc master to make the recording layer exposed to light, by which information is recorded on the optical disc master.

In such an optical disc master exposure apparatus, a coherent beam, which is light emitted (radiated) from a light source, is subjected to modulation or polarization in response to information to be recorded, thereby forming recording light. The recording light is converged to the recording layer of the optical disc master via an objective lens to make the recording layer exposed to light. Thus, information is recorded on the optical disc master. Further, it is known that an astigmatic method is used in focus control of the optical disc master exposure apparatus, i.e., in focus control for performing a positional adjustment of a distance between the optical disc master and the objective lens so that a spot shape of recording light converged on the optical disc master becomes closer to a specified focused point shape.

Now a typical configuration of a focus optical system adopted in conventional optical disc master exposure apparatuses is described with reference to FIG. 7.

Figure 7:
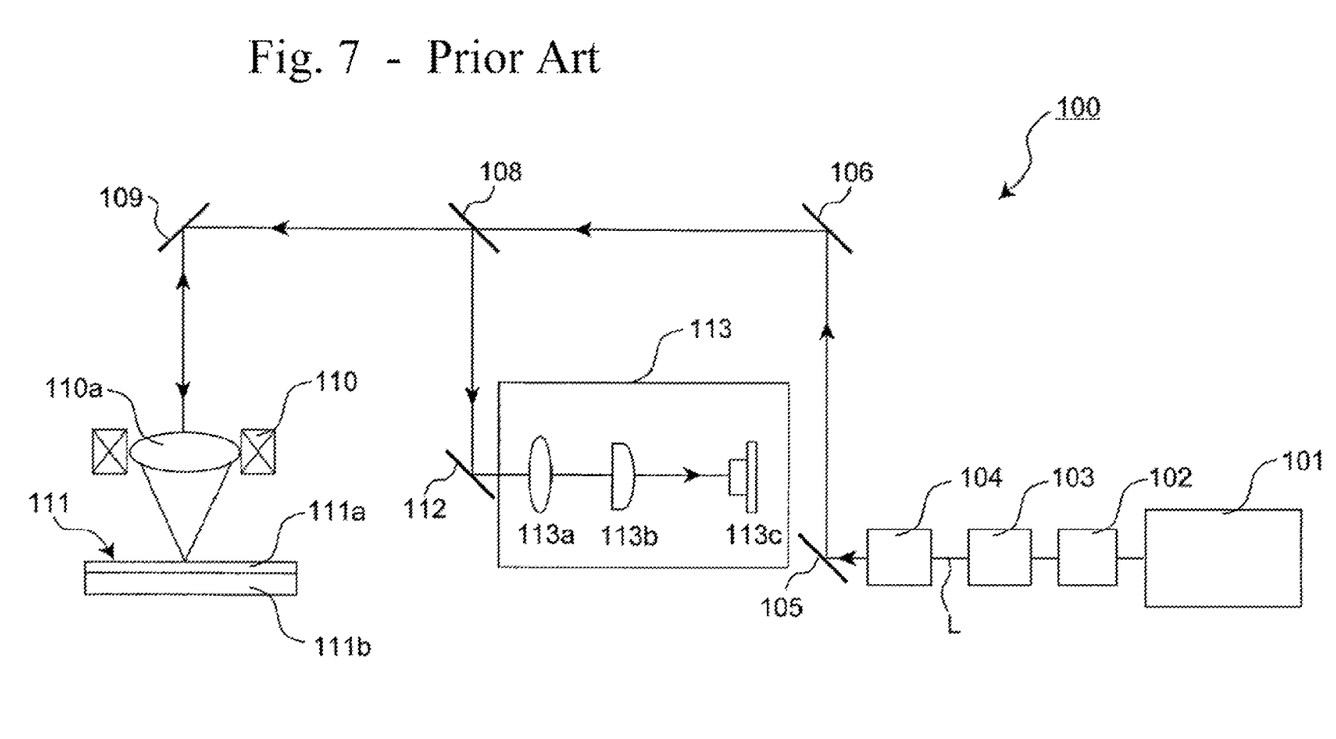
FIG. 7 is a block diagram of an optical disc master exposure apparatus including a conventional focus optical system.

As shown in FIG. 7, in a conventional optical disc master exposure apparatus 100, a coherent laser beam L emitted from a light source 101 passes through a power-and-signal modulating section 102, a polarizer 103 and a beam shaping section 104, and is reflected by a mirror 105 and a half mirror 106, partly transmitted by a transmitting mirror 108 and reflected by a dichroic mirror 109, thus the laser beam L being directed toward an optical disc master 111. Further, passing through an objective lens 110a that has been adjusted in its distance to the optical disc master 111 by an actuator 110 serving as a lens drive unit, the laser beam L is converged to the optical disc master 111. As a result, in the optical disc master 111 in which a resist film 111a serving as a recording layer (organic or inorganic resist layer) is placed on a glass master 111b, the resist film 111a is exposed to the laser beam L, so that information is recorded thereon. Meanwhile, a reflected beam (reflected light) of the laser beam L from the optical disc master 111 travels in reverse directions, and is partly reflected by the transmitting mirror 108 so as to be diverged from an optical path of the laser beam L. Thereafter, the diverged reflected beam is reflected by a mirror 112, passing through a converging lens (convex lens) 113a and a cylindrical lens 113b so as to be converged to a 4-division photodetector 113c.

Figure 8A:
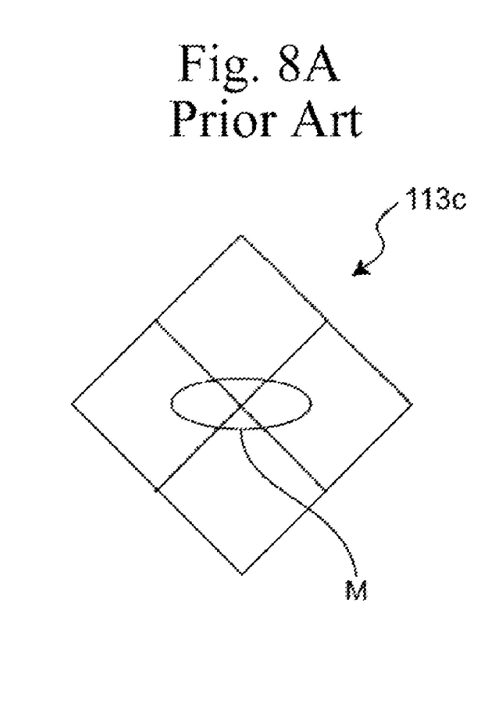
FIG. 8A is an explanatory view of a focused point state of the conventional focus optical system, showing a case that the optical disc master is positioned closer to the focal point position of the objective lens.
Figure 8B:
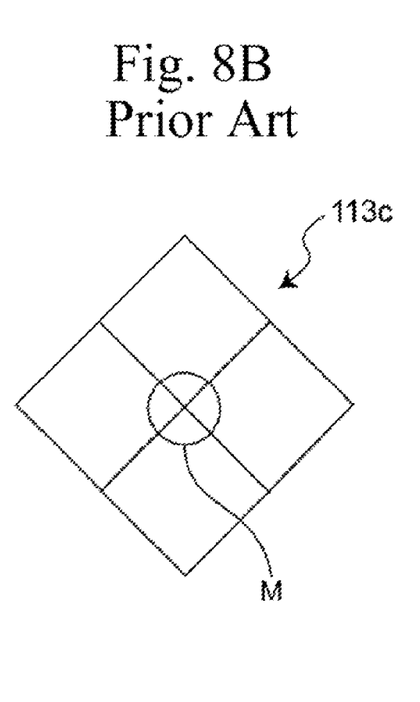
FIG. 8B is an explanatory view of a focused point state of the conventional focus optical system, showing a case that the optical disc master is positioned at the focal point position of the objective lens.
Figure 8C:
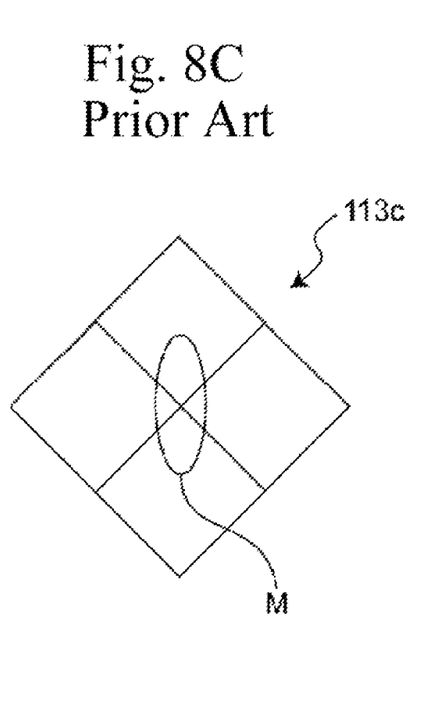
FIG. 8C is an explanatory view of a focused point state of the conventional focus optical system, showing a case that the optical disc master is positioned farther from the focal point position of the objective lens.

The converging lens 113a and the cylindrical lens 113b cause an occurrence of astigmatism. The reflected beam is received by the 4-division photodetector 113c in different spot shapes depending on whether the optical disc master 111 is positioned closer to (i.e., a case where a distance between the objective lens 110a and the optical disc master 111 is shorter than the focal length), or coincident with, or farther from a focal point position of the objective lens 110a (i.e., a case where the distance between the objective lens 110a and the optical disc master 111 is longer than the focal length). More specifically, on condition that the optical disc master 111 is positioned closer to the focal point position of the objective lens 110a, a spot M of the reflected beam results in a laterally elongated elliptical shape on the 4-division photodetector 113c as shown in FIG. 8A. On condition that the optical disc master 111 is positioned at the focal point position, the spot M of the reflected beam results in a circular shape as shown in FIG. 8B. On condition that the optical disc master 111 is positioned farther from the focal point position of the objective lens 110a, the spot M of the reflected beam results in a longitudinally elongated elliptical shape as shown in FIG. 8C. It is noted that in the optical disc master exposure apparatus 100, the converging lens 113a, the cylindrical lens 113b and the 4-division photodetector 113c are referred to as an astigmatic optical system 113 (see FIG. 7).

Figure 9:
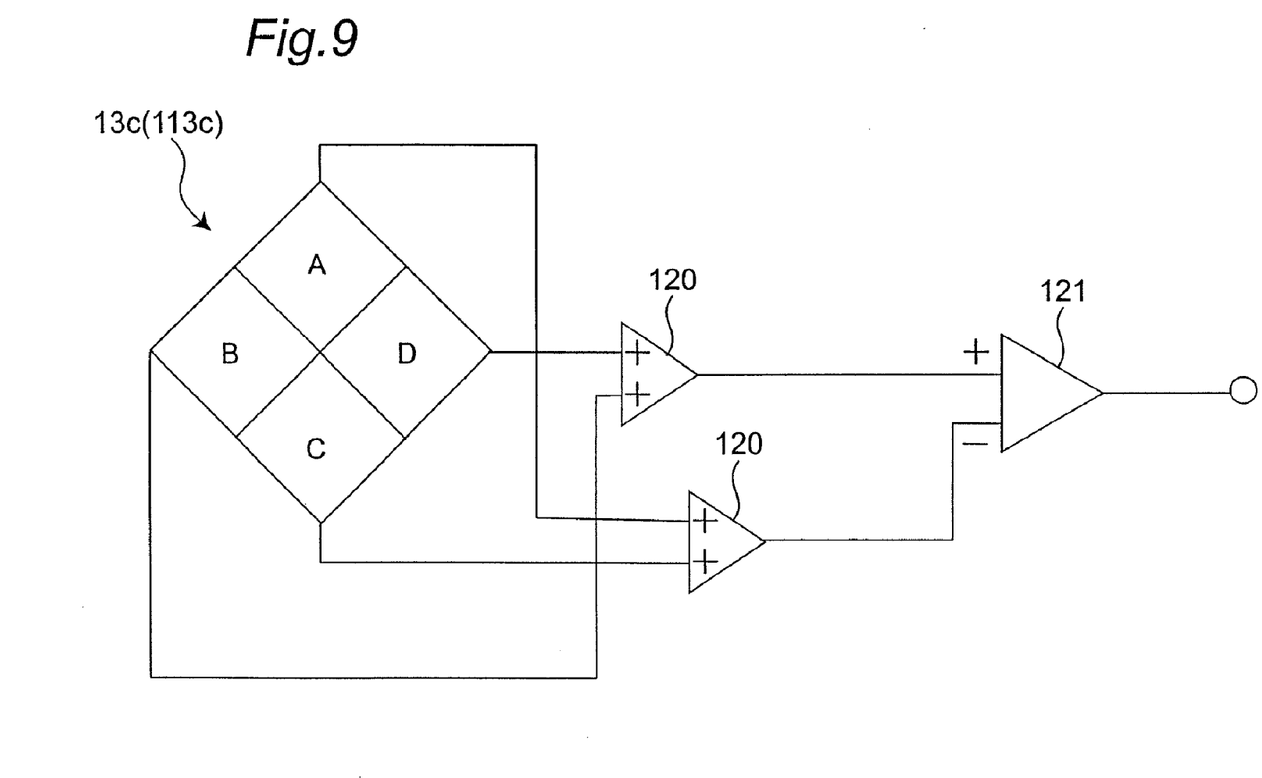
FIG. 9 is a schematic explanatory view of a common astigmatic method using a 4-division detector.

FIG. 9 shows a configuration of the 4-division photodetector 113c. As shown in FIG. 9, the 4-division photodetector 113c includes four photodetectors A, B, C, D having a light-receiving surface orthogonal to an optical axis of the reflected beam in the astigmatic optical system 113. The individual photodetectors A-D are placed in adjacency via two dividing lines orthogonal to each other. Upon reception of reflected light on the 4-division photodetector 113c including such four photodetectors A-D as shown above, a difference between sum signals (A+C) and (B+D) of diagonal photodetectors placed at mutually opposite positions bordering each other on an intersection point of the two dividing lines, the difference being {(A+C)−(B+D)} outputted by adders 120 and a subtracter 121, serves as a focus error signal that is a signal corresponding to a positional relation between the objective lens 110a and the optical disc master 111. In order that the focus error signal normally keeps a constant value (or near a constant value), drive of the actuator 110 is controlled to adjust the position of the objective lens 110a, by which the focal point position of the objective lens 110a is held on the resist film 111a of the optical disc master 111.

With the focal point position of the objective lens 110a adjusted to a specified focused point state as shown above, the modulated laser beam L is projected onto the resist film 111a, by which uniform pits or grooves are formed on the resist film 111a so that information is recorded thereon.

In such a conventional optical disc master exposure apparatus, various optical techniques such as disclosed in Literatures 1 to 8 are used.

Literature 1: JP H11-175987 A
Literature 2: JP 2007-287232 A
Literature 3: JP 2001-216659 A
Literature 4: JP 2002-329338 A
Literature 5: JP 2001-108877 A
Literature 6: USP Application Publication. No. 2007/0242575
Literature 7: USP Application Publication. No. 2007/0081441
Literature 8: U.S. Pat. No. 6,809,829

SUMMARY OF THE INVENTION

Figure 10:
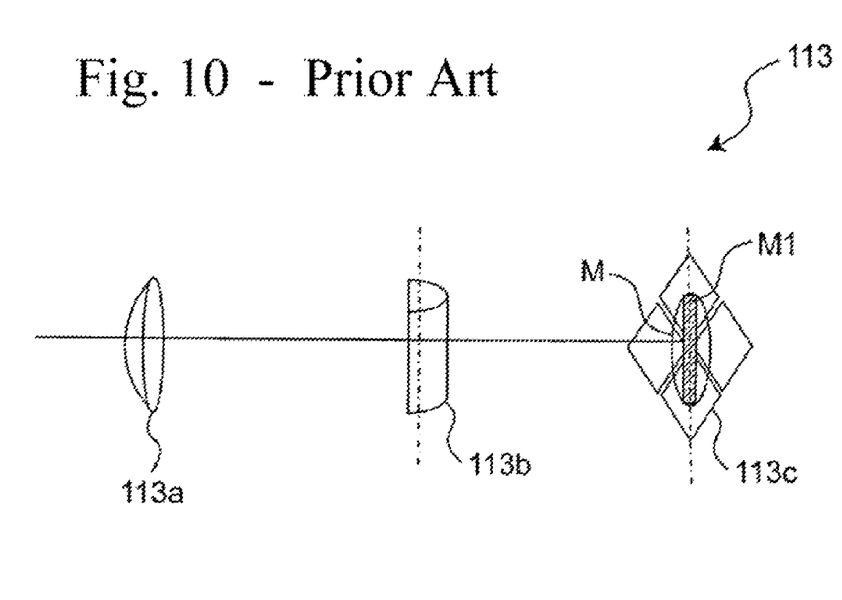
FIG. 10 is a configurational view of a conventional common astigmatic optical system.

With the astigmatic optical system 113 of the conventional optical disc master exposure apparatus 100, there may be cases in which a beam (reflected light) reflected by a surface of the glass master 111b and a beam (reflected light) reflected by a surface of the resist film 111a that is a photosensitive material applied on the surface of the glass master 111b interfere with each other. Upon occurrence of such interference, an interference fringe M1 due to the interference arises at the spot M of the reflected beam received on the 4-division photodetector 113c as shown in FIG. 10. Particularly when the resist film 111a has a film thickness that is (λ/2)n times larger than a wavelength λ of the beam (reflected light), the interference fringe M1 on the 4-division photodetector 113c appears noticeable. As a result, there is a problem that the focus error signal becomes unstable, causing variations in an adjustment state of the focal point position of the objective lens 110a relative to the optical disc master 111, i.e., in the focusing state.

Accordingly, an object of the present invention, lying in solving the above-described issue, is to provide a focus optical system which is less susceptible to interference fringes that occur to reflected light from an optical disc or optical disc master, as well as to provide an optical disc master exposure apparatus including such a focus optical system.

In order to achieve the above object, the invention has the following constitution.

According to a first aspect of the present invention, there is provided an optical-disc focus optical system comprising:

an optical modulating section for modulating or polarizing emitted light from a light source;

an objective lens for converging emitted light, which has been modulated or polarized by the optical modulating section, onto an optical disc;

an optical path diverging section for diverging, from an optical axis of the emitted light, reflected light reflected from the optical disc;

an astigmatic optical system which includes a converging lens, a cylindrical lens and a 4-division detector with a dead zone placed on its dividing lines orthogonally intersecting each other, and by which reflected light diverged by the optical path diverging section is made to be received on the 4-division detector via the converging lens and the cylindrical lens by using an astigmatic method; and a lens drive unit for, based on a result of detection of reflected light by the 4-division detector, adjusting a position of the objective lens so that a spot shape of emitted light converged on the optical disc via the objective lens becomes closer to a focused point shape, wherein in the astigmatic optical system, the 4-division detector is positioned relative to an optical axis of the astigmatic optical system so that one of the dividing lines is placed along a longitudinal direction of an interference fringe of reflected light appearing on the 4-division detector, while the cylindrical lens is positioned relative to the optical axis of the astigmatic optical system so that a cylindrical axis of the cylindrical lens is placed at a 45° skew to the dividing line of the 4-division detector.

According to a second aspect of the present invention, there is provided the optical-disc focus optical system as defined in the first aspect, wherein the astigmatic optical system further includes a rotation drive unit for rotating the cylindrical lens and the 4-division detector about the optical axis.

According to a third aspect of the present invention, there is provided the optical-disc focus optical system as defined in the first aspect, wherein the astigmatic optical system further includes a moving unit for moving the cylindrical lens and the 4-division detector in first and second directions orthogonal to each other within a plane orthogonally intersecting the optical axis as well as in a third direction parallel to the optical axis.

According to a fourth aspect of the present invention, there is provided an optical disc master exposure apparatus comprising the optical-disc focus optical system as defined in the first aspect, wherein the optical disc is an optical disc master having a recording layer provided therein, and emitted light subjected to modulation or polarization by the optical modulating section in response to information to be recorded is converged on the recording layer of the optical disc master via the objective lens so that the recording layer is exposed to light, whereby information is recorded on the recording layer of the optical disc master.

According to the optical-disc focus optical system of the invention, in the astigmatic optical system, the 4-division detector is positioned relative to the optical axis so that one of the dividing lines of the 4-division detector is placed along the longitudinal direction of an interference fringe appearing on reflected light derived from the optical disc. As a result, the interference fringe appearing on the reflected light can be positioned on the dead zone of the 4-division detector. Further, the cylindrical lens is so positioned that the cylindrical axis of the cylindrical lens is placed at a 45° skew to the dividing lines of the 4-division detector. As a result, even when a spot shape of reflected light is formed into an elliptical beam shape in the 4-division detector, the longitudinal direction of the elliptical beam can be directed at a 45° skew to each dividing line, so that the elliptical beam can be securely received by two detectors (diagonal detectors) facing each other with the intersection point of the dividing lines bordering each other. Accordingly, a positional adjustment of the objective lens can be fulfilled by the lens drive unit so that variations of the focus error signal become closer to zero while output variations of the 4-division detector due to emergence of interference fringes are suppressed by exploiting the dead zone, thus making it possible to obtain a stable focused state.

Also, the optical disc master exposure apparatus including the focus optical system of the invention is enabled to suppress variations of the focus error signal due to changes in the surface film thickness of the optical disc master (i.e., film thickness of the recording layer). Thus, variations of the focused state in exposure step of the optical disc master can be suppressed, making it possible to achieve a successful manufacture of the optical disc master.

BRIEF DESCRIPTION OF THE DRAWINGS

These aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Hereinbelow, embodiments of the invention will be described in detail with reference to the drawings.

Figure 6:
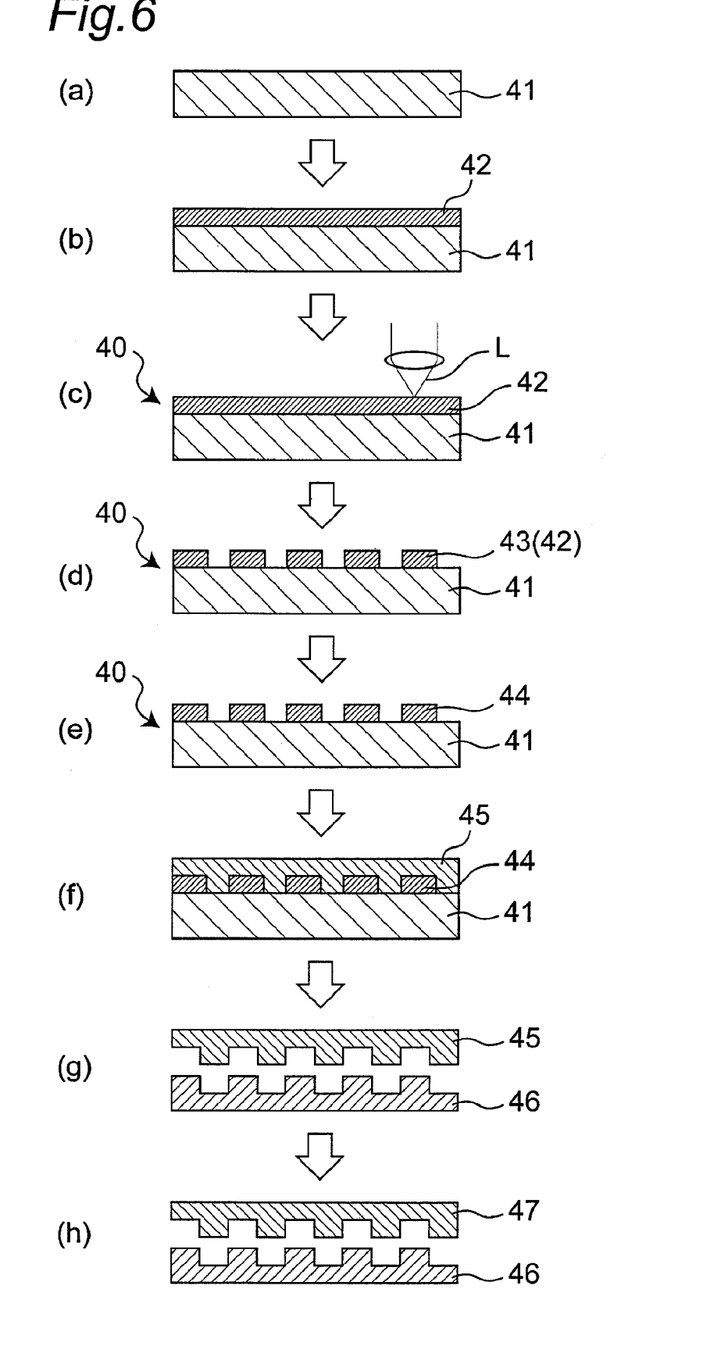
FIGS. 6(a) to (h) are explanatory views of optical disc mastering processes with use of the optical disc master exposure apparatus of the embodiment.

Before the constitution of an optical disc master exposure apparatus including a focus optical system according to an embodiment of the invention is described, optical disc mastering processes using an optical disc master exposure apparatus are described with reference to FIG. 6.

Soda-lime glass, quartz glass, Si substrate or the like is used as a substrate of the optical-disc mastering disc (optical disc master) (FIG. 6(a)). With use of a glass master 41 as an example, the glass master 41 is subjected to a grinding process so as to have a specified thickness. On this glass master 41, a photoresist film (hereinafter, referred to as a resist film) 42 of an organic material is formed by spin coating (FIG. 6(b)). Instead of the resist film, a recording layer may be formed with use of an inorganic recording material by sputtering process. In the following description, as a representative of both cases, a case in which the resist film 42 is formed is described as an example. The resist film 42 (recording layer) has a thickness of about 10-300 nm, which varies depending on the disc format of a disc such as CD, DVD and BD, the reflecting film used in the disc, or the recording material.

With the use of the optical disc master exposure apparatus, which is an optical recording apparatus, a laser beam L is projected to the resist film 42 on the glass master 41 to make the resist film 42 exposed to light, by which signal pits or guide grooves are patterned (FIG. 6(c)). Thereafter, exposed portions are developed by an alkali developer (FIG. 6(d)), causing only the exposed portions in the resist film 42 to be eluted, by which a pit-and-bump pattern or grooves 43 (resist layer 42) as a desired pit configuration are formed on the glass master 41. Thus, the glass master 41 on which the grooves 43 made of the resist layer 42 have been formed results in an optical disc master 40. Next, on the surface of the optical disc master 40 on which the grooves 43 have been formed, a conductive film (nickel thin film) 44 is formed by sputtering or electroless process (FIG. 6(e)). This is followed by nickel electrocasting (FIG. 6(f)), by which a master stamper 45 is manufactured.

In addition, in a case where the recording layer is formed from an inorganic recording material on the glass master 41 by sputtering process in FIG. 6(b), the conductive film forming process of FIG. 6(e) may be omitted.

On a mother ring of the master stamper 45 manufactured in this way, i.e., on the master stamper 45, nickel electrocasting process is performed to form a mother 46 (FIG. 6(g)). Further on the mother 46, nickel electrocasting is performed (FIG. 6(h)), by which a stamper 47 for use of optical-disc injection molding is completed. It is noted that the above-described mothering (FIGS. 6(g) and (h)) may be omitted in some cases.

Figure 1:
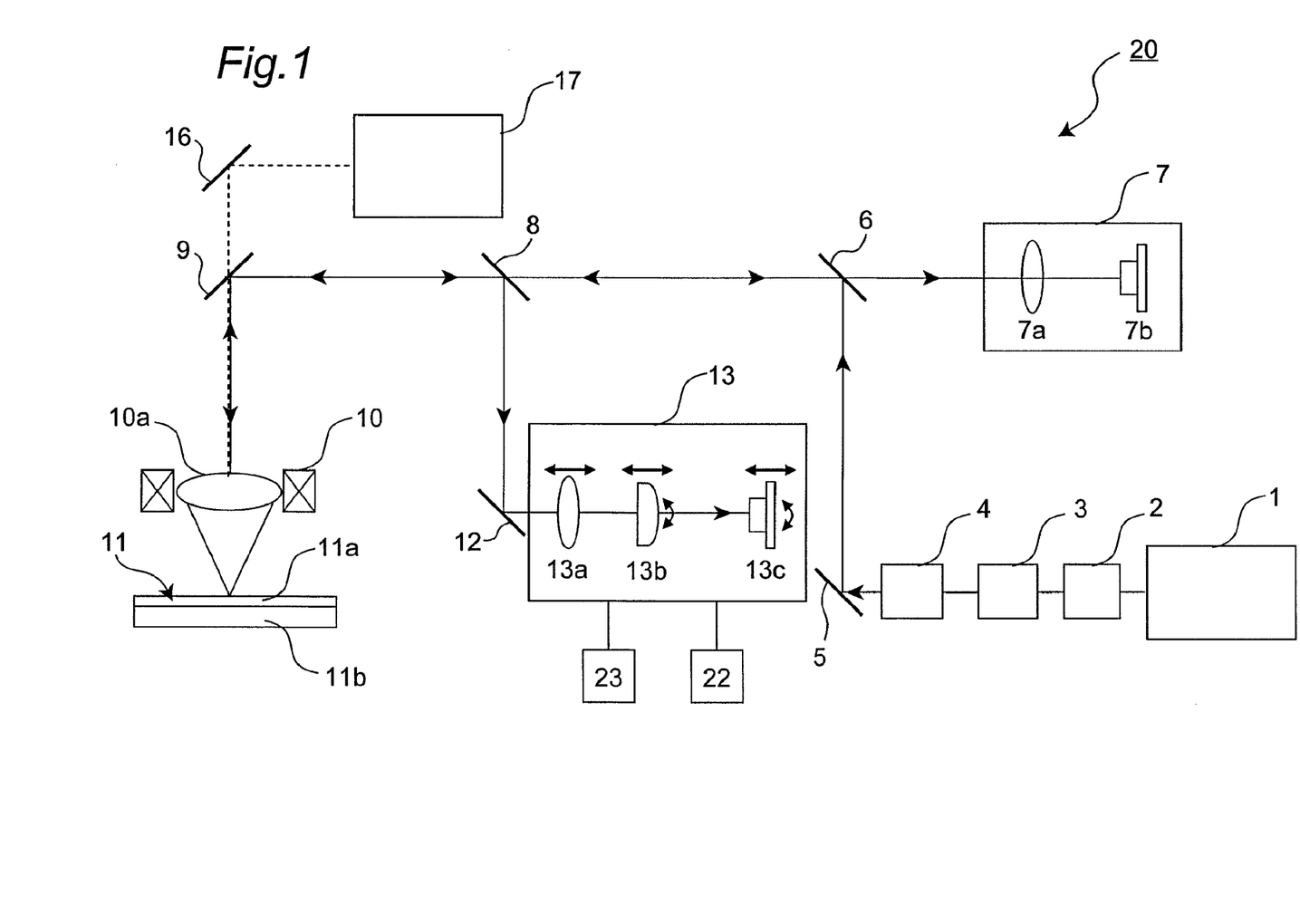
FIG. 1 is a block diagram of an optical disc master exposure apparatus including a focus optical system according to an embodiment of the present invention.
Figure 2:
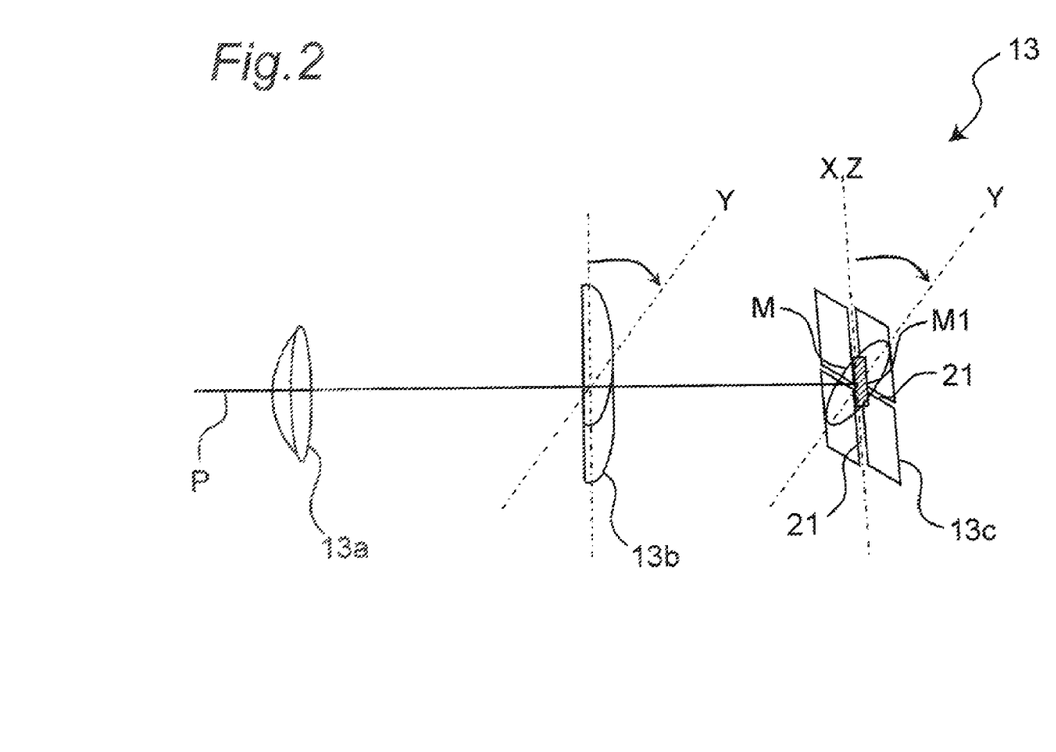
FIG. 2 is a configurational view of an astigmatic optical system in the embodiment.
Figure 3:
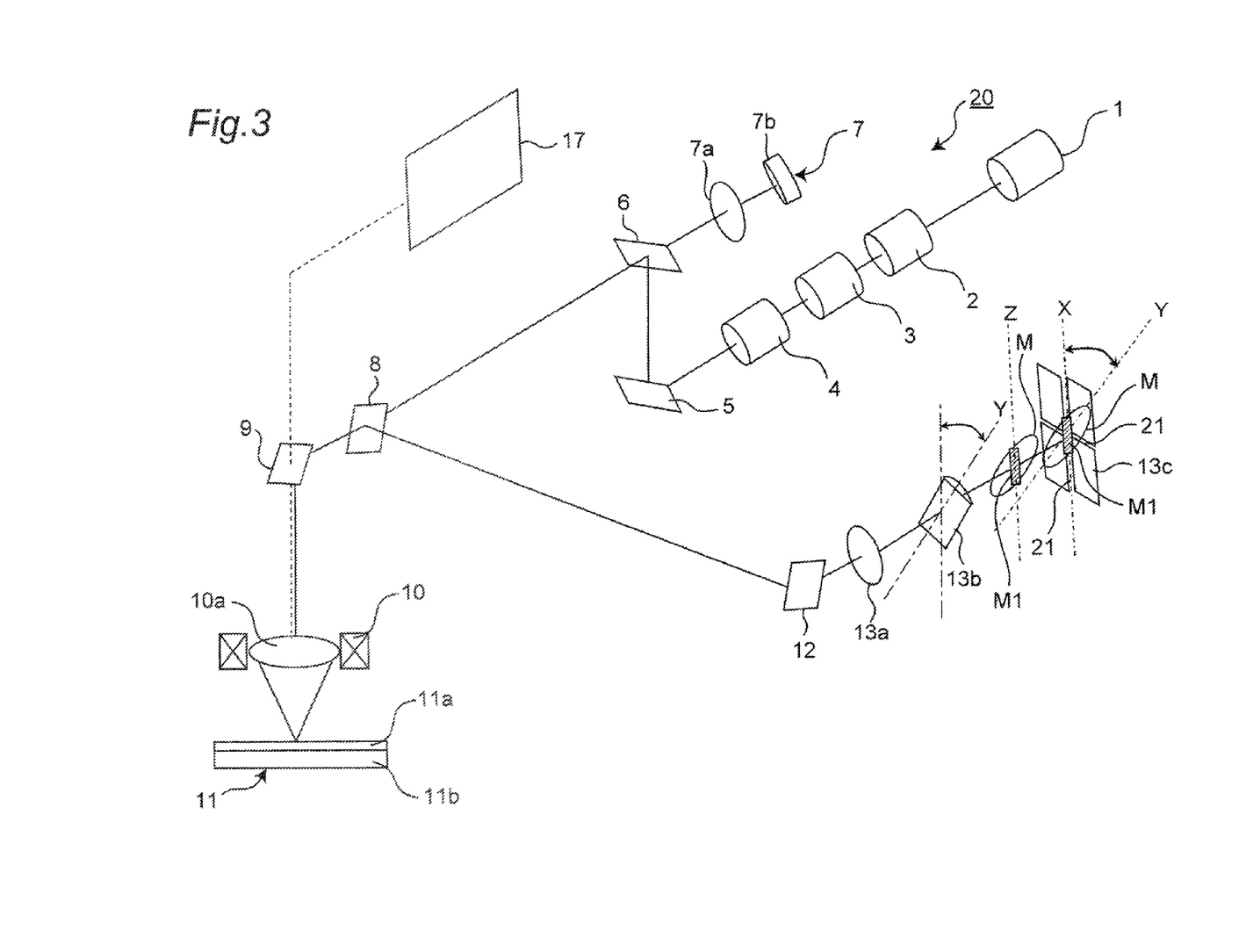
FIG. 3 is a configurational view of the optical disc master exposure apparatus of the embodiment.

Next, a configuration of an optical disc master exposure apparatus 20 including the focus optical system according to an embodiment of the invention is described. FIG. 1 is a block diagram showing the configuration of the optical disc master exposure apparatus 20. FIG. 2 is a configurational view of an astigmatic optical system included in the optical disc master exposure apparatus 20. FIG. 3 is a configurational view of the optical disc master exposure apparatus 20.

As shown in FIGS. 1 and 3, a laser beam (emitted light) L emitted from a laser device 1, which is a light source for emitting coherent light (beam), is subjected to appropriate attenuation of light intensity by a power-controlling optical modulator 2. Further, in an optical modulating section 3, the laser beam L is subjected to intensity modulation or frequency polarization toward left-and-right or up-and-down directions vertical to the optical axis in response to information to be recorded, thus the laser beam L being outputted therefrom. The laser beam L outputted from the optical modulating section 3 is shaped into a laser beam of an appropriate size by a beam shaping section 4, reflected by a mirror 5 and a half mirror (partly transmitting mirror) 6, transmitted by a half mirror 8, and reflected by a dichroic mirror 9. After that, the laser beam L goes incident on an objective lens 10a fitted to an actuator 10, which is a lens drive unit.

The laser beam L having been incident on the objective lens 10a is converged and projected onto a resist film 11a formed on an optical disc master 11 in which an organic or inorganic resist film 11a (hereinafter, referred to as "resist film 11a") has been formed on a glass master 11b. In this case, the recording-use laser beam L projected onto the optical disc master 11 via the objective lens 10a is focused on the resist film 11a, where the resist film 11a is exposed to light by a photolithography method for a case in which the resist film 11a is made of organic resist, and by a thermal recording method for another case in which the resist film 11a is made of inorganic resist. The laser device 1 preferably has a wavelength that is sensed by an organic resist film in the photolithography method or that gives enough thermal energy to an inorganic resist film by the thermal recording method, and therefore a 266-nm deep UV laser, a 351-nm gas laser or a 405-nm semiconductor laser is used.

The reflected beam (reflected light) reflected by the optical disc master 11 passes again through the objective lens 10a, is reflected by the dichroic mirror 9, partly transmitted by the half mirror 8 while reflected in another part by the half mirror 8, thus being diverged from the optical path of the laser beam L. The beam transmitted by the half mirror 8 goes incident on a beam monitor optical system 7, is transmitted by a convex lens 7a, and converged onto a CCD (Charge-Coupled Device) detector 7b.

The convex lens 7a and the CCD detector 7b of the beam monitor optical system 7 are preliminarily adjusted by the objective lens 10a to such a positional relation that the laser beam is converged to a focal point of the objective lens 10a. That is, the laser beam L transmitted by the objective lens 10a comes to an optimum focused state when the diameter of a focused beam converged on the CCD detector 7b comes to a minimum.

Meanwhile, the reflected beam reflected by the mirror 8 is reflected by a mirror 12 so as to be incident on an astigmatic optical system 13. The reflected beam incident into the astigmatic optical system 13 goes through a convex lens (converging lens) 13a and a cylindrical lens 13b so as to be incident on a 4-division detector 13c as a beam having astigmatism in right-and-left and up-and-down directions vertical to the optical axis. These convex lens 13a, cylindrical lens 13b and 4-division detector 13c constitute the astigmatic optical system 13. Also, in order to implement a later-described focus servo system by an astigmatic method in this embodiment, the cylindrical lens 13b is placed in such a positional relation that its cylindrical axis direction coincides with a dividing-line direction of the 4-division detector 13c. In addition, a $\lambda/4$ plate and a polarization beam splitter (PBS) may be used instead of the half mirror 8. That is, a member other than a half mirror may be adopted only if it functions as an optical path diverging section for diverging a reflected beam from the optical path of the laser beam L.

The focus servo system by the astigmatic method exploits astigmatism of the reflected beam arising on the 4-division detector 13c due to a difference in focal length between the convex lens 13a and the cylindrical lens 13b. More specifically, as a distance between the objective lens 10a and the optical disc master 11 changes, a configuration of the spot M of the reflected beam on the 4-division detector 13c changes into an elongated elliptical shape, causing a potential difference between sum signals (A+C) and (B+D) of individual diagonal photodetectors in the 4-division detector 13c, i.e., a focus error signal. The resulting focus error signal is fed back to the actuator 10 to exert drive control of the actuator 10 so that the focus error signal is maintained at zero. Thus, it becomes possible to implement a servo system, i.e. astigmatic focus servo system, in which even in cases where the distance between the objective lens 10a and the optical disc master 11 changes due to surface warps of the optical disc master 11 or film thickness changes of the resist film 11a or the like, the position of the objective lens 10a is controlled to keep a constant distance between the objective lens 10a and the optical disc master 11.

Generally, the astigmatic focus servo system, in which a recording laser beam converged by the objective lens 10a is directly used for focus servo, has characteristics of high-precision focus position as well as less susceptibility to angular changes of the reflected beam due to surface deformations of the optical disc master 11. On the other hand, the astigmatic focus servo system has issues of a narrow dynamic range of focus and an impossibility to do focus control fundamentally at sites where no recording laser beam is present.

Therefore, normally, an auxiliary focus servo optical system denoted by reference sign 17 in FIGS. 1 and 3 is further combined with the astigmatic optical system 13 to enable the focus control. A laser beam emitted from the auxiliary focus servo optical system 17 is reflected by a mirror 16 so as to be transmitted by the dichroic mirror 9 and the objective lens 10a and reflected by the surface of the optical disc master 11. This reflected beam is transmitted again by the objective lens 10a and the dichroic mirror 9, reflected by the mirror 16, going incident on the auxiliary focus servo optical system 17. Thus, the focus servo is enabled based on the resulting incident light detection signal.

As the auxiliary focus servo system, a system that enables focusing on a flat optical disc master 11, e.g., a skew beam system is used. Also, as to the wavelength of the laser used in the auxiliary focus servo optical system, for example, a 635-nm, 3 mW or so semiconductor laser or a 633-nm, 2 mW or so gas laser that exerts neither exposure nor thermal effects on the organic photoresist or inorganic resist of the resist film 11a is used.

Figure 5A:
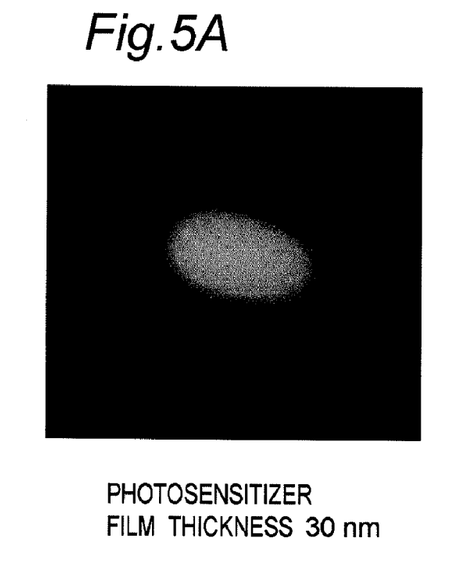
FIG. 5A is an explanatory view of a state of a beam incident on the astigmatic optical system, where the recording laser beam has a wavelength of 266 nm (with a photosensitizer film thickness of 30 nm)
Figure 5B:
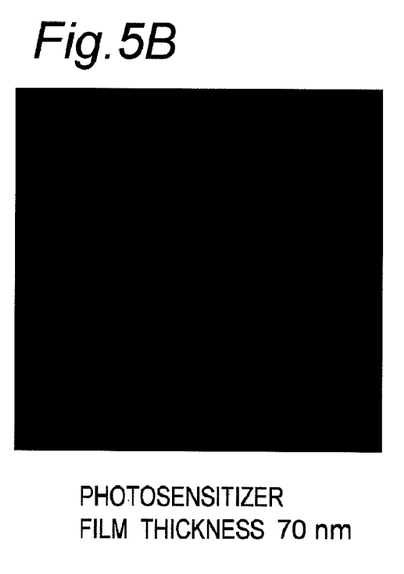
FIG. 5B is an explanatory view of a state of a beam incident on the astigmatic optical system, where the recording laser beam has a wavelength of 266 nm (with a photosensitizer film thickness of 70 nm)
Figure 5C:
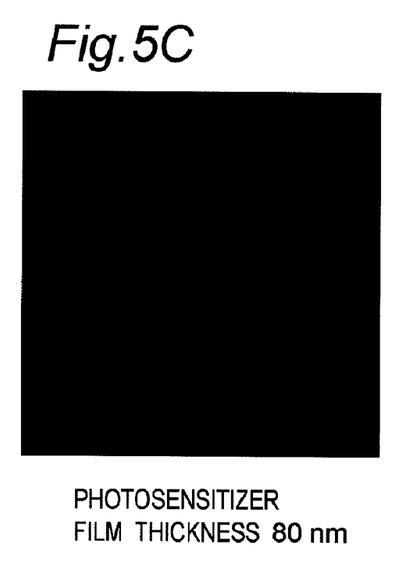
FIG. 5C is an explanatory view of a state of a beam incident on the astigmatic optical system, where the recording laser beam has a wavelength of 266 nm (with a photosensitizer film thickness of 80 nm)

FIG. 2 is a configurational view of the astigmatic optical system (astigmatic focus optical system) 13 in this embodiment. FIGS. 5A, 5B and 5C show shapes of an incident beam on the astigmatic optical system 13, where a laser beam having a recording laser wavelength of 266 nm is used as the laser beam L.

As shown in FIGS. 5A, 5B and 5C, interference fringes by a reflected beam from the optical disc master 11 are generated depending on a correlation between the wavelength of the recording laser beam and the film thickness of the resist film (photosensitizer) 11a on the glass master 11b. That is, if the film thickness of the resist film 11a is an odd multiple of $\lambda/(4N)$ (where N is a refractive index of the photosensitizer) with respect to the wavelength of the laser beam L, there occur no interference fringes because of mutual strengthening interaction between a reflected beam from the surface of the glass master 11b and a reflected beam from the surface of the resist film 11a, whereas interference fringes occur on condition that the film thickness of the resist film 11a is an even multiple.

FIG. 5A shows a case of a 30-nm film thickness of the resist film 11a on the glass master 11b with a laser wavelength of 266 nm, FIG. 5B shows a case of a 70-nm film thickness of the resist film 11a, and FIG. 5C shows a case of an 80-nm film thickness of the resist film 11a. With a film thickness close to an even multiple, i.e., with an 80-nm film thickness of the resist film 11a as shown in FIG. 5C, a clear interference fringe appears nearly at a center of the reflected beam so as to extend up and down as in the figure. Such an interference fringe occurs along a vertical direction or a horizontal direction with respect to the recording laser beam, where the direction of occurrence (longitudinal direction) of the interference fringe depends on the placement of the astigmatic optical system 13 in FIG. 3. For example, when the astigmatic optical system 13 is placed along the left-and-right direction with respect to a direction in which the optical axis extends, i.e., when the reflected beam is diverged at the mirror 8 toward a horizontal direction (with a placement configuration as shown in FIG. 3), the interference fringe occurs along a vertical direction with respect to the optical axis. Also, when the astigmatic optical system 13 is placed along an up-and-down direction with respect to the light traveling direction (optical axis direction), i.e., when the reflected beam is diverged at the mirror 9 toward a vertical direction, the interference fringe occurs along a horizontal direction with respect to the optical axis. In addition, in cases where a glass master of good flatness is used as the substrate, such interference fringes as shown above tend to occur.

The focus optical system of this embodiment exploits such relationships between the direction of occurrence of interference fringes and the placement configuration of the astigmatic optical system 13 so as to suppress effects of occurrence of interference fringes on the focus control.

First, as shown in FIGS. 2 and 3, the 4-division detector 13c has a configuration that photodetectors are placed at four regions, respectively, divided by two dividing lines orthogonally intersecting each other, so that a projected reflected beam is detected by light-receiving surfaces of the individual photodetectors that are placed vertical to an optical axis P. Between mutually adjacent photodetectors, i.e., on the two dividing lines is placed a strip-shaped dead zone 21 that is insensible to light. Even when a reflected beam is projected to the 4-division detector 13c, light projected onto the dead zone 21 is not detected, and only light projected to the light-receiving surfaces of the individual photodetectors is detected. A dead zone having a width of about 100 μm is generally used for such 4-division detectors used in optical systems or optical disk drives.

As shown in FIGS. 2 and 3, in the astigmatic optical system 13, the 4-division detector 13c is positioned relative to the optical axis P so that the above-mentioned direction Z of occurrence of an interference fringe (or a longitudinal direction, which is a vertical direction in this embodiment), and one dividing line (or dividing axis) X in the 4-division detector 13c are set along one same direction. Further, the cylindrical lens 13b is positioned relative to the optical axis P so that a cylindrical axis Y of the cylindrical lens 13b is set at a 45° skew to the dividing line X of the 4-division detector 13c.

With such a placement configuration adopted in the astigmatic optical system 13, even when the interference fringe M1 occurs as shown in FIGS. 2 and 3, the interference fringe M1 can be overlapped on the dead zone 21 by virtue of the placement that the longitudinal direction of the emerging interference fringe M1 and the dividing line X of the 4-division detector 13c are set along the same direction. Further, because of a 45° skew of the cylindrical axis Y of the cylindrical lens 13b to the dividing line X, in a case where the reflected beam is received as an elliptical beam, it is implementable to set the longitudinal direction of the elliptical beam skewed by 45° to each of the dividing lines X.

Figure 4A:
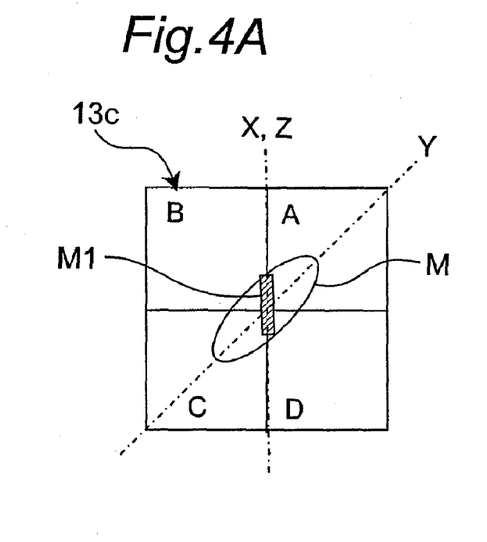
FIG. 4A is an explanatory view of a focused point state of the focus optical system of the embodiment, showing a case that an optical disc master is positioned farther from the focal point position of the objective lens.
Figure 4B:
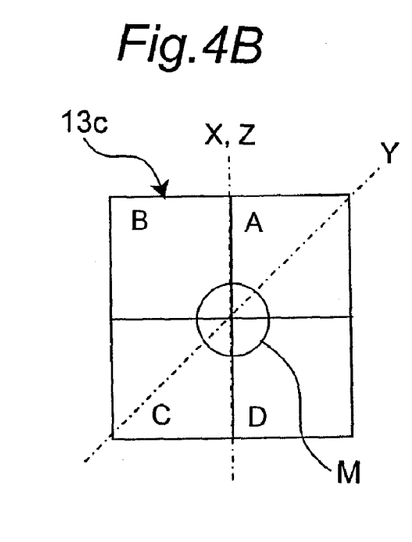
FIG. 4B is an explanatory view of a focused point state of the focus optical system of the embodiment, showing a case that the optical disc master is positioned at the focal point position of the objective lens.
Figure 4C:
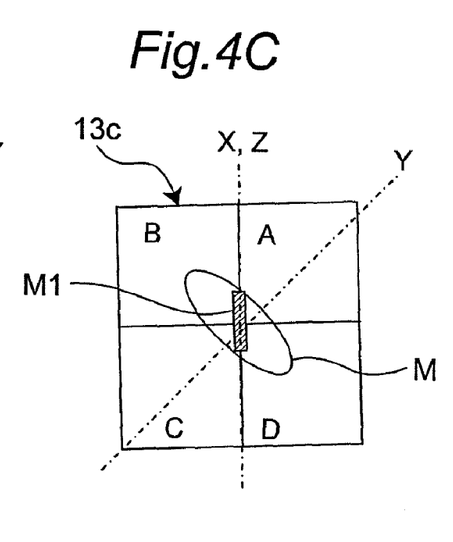
FIG. 4C is an explanatory view of a focused point state of the focus optical system of the embodiment, showing a case that the optical disc master is positioned closer to the focal point position of the objective lens.

In this connection, schematic views of shapes of the spot M of a reflected beam received by the 4-division detector 13c of the astigmatic optical system 13 are shown in FIGS. 4A, 4B and 4C. As shown in FIG. 4A, when the optical disc master 11 is positioned farther from the focal point position of the objective lens 10a, the spot M of the reflected beam is formed into an elliptical beam shape whose longitudinal direction is along the cylindrical axis Y of the cylindrical lens 13b. In this case, the spot M can be securely detected by two sets of diagonally placed photodetectors A and C and photodetectors B and D. Moreover, since a direction Z of occurrence of the interference fringe M1 is coincident with the direction of the dividing line X, the interference fringe M1 can be overlapped on the dead zone 21. As shown in FIG. 4C, when the optical disc master 11 is positioned closer to the focal point position of the objective lens 10a, the spot M of the reflected beam is formed into an elliptical beam shape whose longitudinal direction is orthogonal to the cylindrical axis Y of the cylindrical lens 13b. In this case, the spot M can be securely detected by the two sets of diagonally placed photodetectors B and D and photodetectors A and C. Further, since the direction Z of occurrence of the interference fringe M1 is coincident with the direction of the dividing line X, the interference fringe M1 can be overlapped on the dead zone 21. In addition, FIG. 4B shows a case in which the focal point position of the objective lens 10a is coincident with the optical disc master 11, where the spot M of the reflected beam results in a generally circular shape.

As shown above, according to the focus optical system of this embodiment, a reflected beam can be detected in a state that the interference fringe M1 appearing in the reflected beam is overlapped on the dead zone 21 of the 4-division detector 13c. Thus, variations of outputs (potential differences or focus error signals) of the 4-division detector 13c due to occurrence of the interference fringe M1 can be suppressed, so that a stable astigmatic focus servo can be realized.

As shown in FIG. 1, the astigmatic optical system 13 further includes a rotation drive unit 22 for rotating at least either one of the cylindrical lens 13b and the 4-division detector 13c relative to the other about the optical axis P. By precisely adjusting a relative positional relation of the cylindrical lens 13b and the 4-division detector 13c around the optical axis P with the rotation drive unit 22, the interference fringe M1 can be made to be securely incident on the dead zone 21 of the 4-division detector 13c.

Such an adjustment as shown above is carried out upon occurrence of the interference fringe M1 under a continued observation of $\{(A+C)-(B+D)\}$, which is an output of the subtracter 121 derived from outputs of the photodetectors A, B, C, D shown in FIG. 9. This is followed by displacing a position or positions of at least one of the cylindrical lens 13b and the 4-division detector 13c about the optical axis P to make adjustment and setting of the cylindrical lens 13b and the 4-division detector 13c to a position where variations of the observed voltage are minimized. Thus, quantification of a rotational-direction positional relation between the cylindrical lens 13b and the 4-division detector 13c can be fulfilled. In addition, such a positional adjustment in the rotational direction is preferably performed by rotationally moving the 4-division detector 13c.

Also, as shown in FIG. 1, the astigmatic optical system 13 further includes a moving unit 23 for moving at least one or all of the convex lens 13a, the cylindrical lens 13b and the 4-division detector 13c in first and second directions orthogonal to each other within a plane orthogonally intersecting the optical axis P as well as in a third direction parallel to the optical axis P. Use of such a moving unit 23 makes it possible to adjust the relative positions of the convex lens 13a, the cylindrical lens 13b and the 4-division detector 13c of the astigmatic optical system 13 so that the interference fringe M1 can be made securely incident on the dead zone 21 of the 4-division detector 13c. Such an adjustment is also performed by moving the convex lens 13a, the cylindrical lens 13b and the 4-division detector 13c under a continued observation of $(A+C)$, $(B+D)$ and $\{(A+C)-(B+D)\}$ in FIG. 9 upon occurrence of the interference fringe M1 so that centers of the convex lens 13a and the 4-division detector 13c are adjusted onto the cylindrical axis of the cylindrical lens 13b. In this case also, quantification of the positional relation of two directions vertical to the optical axis can be fulfilled.

Example

An example in which the configuration of the focus optical system of the embodiment shown in FIGS. 1 and 3 is applied to the optical disc master exposure apparatus 20 is described below.

The laser device 1 was provided by using a laser device having a wavelength of 266 nm, the power-controlling optical modulator 2 was provided by a power modulator using an electro-optic modulator (EOM) and a signal modulator using an acousto-optic modulator (AOM), and the optical polarizer 3 was provided by using an electro-optic deflector (EOD). Also, the beam shaping section 4 was provided by using two convex lenses having different focal lengths comprised of a front-side lens and a rear-side lens whose focal length was five times larger than that of the rear-side lens, and the objective lens 10a was provided by a lens having an NA of 0.9.

Further, the beam monitor optical system 7 was provided by using a CCD camera as the convex lens 7a and the CCD detector 7b, and the astigmatic optical system 13 was provided by using the convex lens 13a, the cylindrical lens 13b and the division detector 13c, with a moving unit 23 provided for two directions vertical to their respective optical axes, as well as with a rotation drive unit 22 provided for the cylindrical lens 13b and the 4-division detector 13c.

In addition, such component members as the wavelength of the laser device 1, the power-controlling optical modulator 2, the optical polarizer 3 and the beam shaping section 4 are not limited to the above-described example, and the combination of those component members may be changed, or some of them may be omitted, depending on the type of the laser device used, the format type of the stamper required, the type of photosensitizer on the master, or the like. As an example, there is a case that a semiconductor laser of a 405-nm wavelength is used as the laser device 1 while the power-controlling optical modulator 2 and the optical polarizer 3 are omitted.

With the optical disc master exposure apparatus 20 according to the embodiment having the above-described constitution, optical disc masters 11 in which film thickness of the resist film (photosensitizer) 11a was 30 nm, 70 nm and 80 nm were subjected to mastering process, respectively. As a result, variations of the focus error signal {(A+C)−(B+D)} were able to be suppressed below 1% under all the conditions.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The focus optical system according to the invention is applied to optical disc master exposure apparatuses, and effective for focus optical systems of various types of optical apparatuses for which it is required that interference fringes appearing on a reflected beam derived from a focusing object (e.g., optical disc master) be prevented from affecting focus error signal detection by a detector included in the astigmatic optical system.

The entire disclosure of Japanese Patent Application No. 2008-108821 filed on Apr. 18, 2008, including specification, claims, and drawings are incorporated herein by reference in its entirety.

What is claimed is:

1. An optical-disc focus optical system comprising:
    an optical modulating section for modulating or polarizing emitted light from a light source;
    an objective lens for converging emitted light, which has been modulated or polarized by the optical modulating section, onto an optical disc;
    an optical path diverging section for diverging, from an optical axis of the emitted light, reflected light reflected from the optical disc;
    an astigmatic optical system which includes a converging lens, a cylindrical lens and a 4-division detector with a dead zone placed on its dividing lines orthogonally intersecting each other, and by which reflected light diverged by the optical path diverging section is made to be received on the 4-division detector via the converging lens and the cylindrical lens by using an astigmatic method; and
    a lens drive unit for, based on a result of detection of reflected light by the 4-division detector, adjusting a position of the objective lens so that a spot shape of emitted light converged on the optical disc via the objective lens becomes closer to a focused point shape, wherein
    in the astigmatic optical system, the 4-division detector is positioned relative to an optical axis of the astigmatic optical system so that one of the dividing lines is placed along a longitudinal direction of an interference fringe of reflected light appearing on the 4-division detector, while the cylindrical lens is positioned relative to the optical axis of the astigmatic optical system so that a cylindrical axis of the cylindrical lens is placed at a 45° skew to the dividing line of the 4-division detector.

2. The optical-disc focus optical system as defined in claim 1, wherein the astigmatic optical system further includes a rotation drive unit for rotating the cylindrical lens and the 4-division detector about the optical axis.

3. The optical-disc focus optical system as defined in claim 1, wherein the astigmatic optical system further includes a moving unit for moving the cylindrical lens and the 4-division detector in first and second directions orthogonal to each other within a plane orthogonally intersecting the optical axis as well as in a third direction parallel to the optical axis.

4. An optical disc master exposure apparatus comprising the optical-disc focus optical system as defined in claim 1, wherein
    the optical disc is an optical disc master having a recording layer provided therein, and
    emitted light subjected to modulation or polarization by the optical modulating section in response to information to be recorded is converged on the recording layer of the optical disc master via the objective lens so that the recording layer is exposed to light, whereby information is recorded on the recording layer of the optical disc master.

* * * * *